3,686,150
FUNCTIONAL TERPOLYMERS OF
N-VINYL LACTAMS
Eugne S. Barabas, Watchung, and Marvin M. Fein, Westfield, N.J., assignors to GAF Corporation, New York, N.Y.
No Drawing. Filed Aug. 20, 1970, Ser. No. 65,740
Int. Cl. C08f *15/40*
U.S. Cl. 260—78.5 R    13 Claims

ABSTRACT OF THE DISCLOSURE

Functional terpolymers are described of an N-vinyl lactam, a mono or half ester of an unsaturated dicarboxylic acid, and an ethylenically unsaturated compound (e.g. an alkyl acrylate), which are useful for forming coatings, sizes, polishes, adhesives and in related areas.

BACKGROUND OF THE INVENTION

Field of the invention

This invention relates to film forming polymers and more particularly to such polymers formed by the reaction of an N-vinyl lactam, a mono or half acid or half ester of an unsaturated dicarboxylic acid and a compound containing vinyl unsaturation and to processes for their production.

Description of the prior art

Copolymers of N-vinyl lactams, and particularly N-vinyl pyrrolidone, with various unsaturated compounds, are well known in the art and have been used in industry as coatings, textile sizes, adhesives and the like. However, in the formation of these polymers previously, it has not been possible to introduce carboxylic acid groups into the copolymers without decomposition of the N-vinyl lactam caused by a devinylation side reaction. Polymers containing carboxylic acid groups are highly desirable as such groups represent a functionality useful for yielding a wide variety of products.

In a recently issued patent of the same assignee, United States Pat. No. 3,511,817 to Fein, et al., issued May 12, 1970, there is disclosed and claimed film-forming copolymers of N-vinyl lactams, e.g. N-vinyl pyrrolidone, and mono or half esters of unsaturated dicarboxylic acids, the copolymers being produced by the copolymerization of a preformed half ester of an unsaturated dicarboxylic acid, e.g. a half ester of maleic acid, with an N-vinyl lactam in the presence of a polymerization catalyst.

The copolymers disclosed in this patent have good film-forming properties and are exceptionally useful in hair spray compositions. The present invention provides an improved terpolymer over the copolymers of No. 3,511,-817 in that a multipolymer system is created, the properties of which can be varied over a very wide range while retaining the valuable carboxylic acid function.

SUMMARY OF THE INVENTION

Accordingly, it is one object of this invention to provide improved film-forming multi-polymers of N-vinyl lactams and compounds which provide a carboxylic acid function in the polymer which overcome or otherwise mitigate the problems of the prior art.

A further objective of this invention is to provide film-forming multi-polymers of N-vinyl lactams, units of a half-acid or half ester of an unsaturated dicarboxylic acid and an ethylenically unsaturated monomer.

Another object of this invention is to provide improved polymeric materials which can be used as coatings, textile sizes, adhesives, polishes and the like and contain functional groups which enable them to be converted to a still wider variety of products.

Further objects and advantages of the invention will become apparent from the following detailed description thereof.

According to this invention, satisfaction of these objects and advantages is achieved by the reaction of monomers of (a) an N-vinyl lactam; (b) a half-acid or half ester of an unsaturated carboxylic acid, and (c) an ethylenically unsaturated compound, which polymers possess properties superior to those known in the art. The polymeric compositions prepared according to this invention are high molecular weight multi-polymers of the components, the polymerization thereof being effected through the double bonds of the reactants, i.e., by vinyl polymerization.

DESCRIPTION OF PREFERRED EMBODIMENTS

As indicated above, the polymers of this invention are prepared by the reaction of (a) an N-vinyl lactam monomer, (b) a half-acid monoester of an unsaturated dicarboxylic acid, and (c) an ethylenically unsaturated compound.

Useful N-vinyl lactams which may be employed in this invention can be conveniently characterized by the formula:

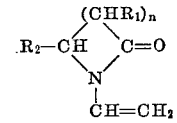

wherein each $R_1$ individually represents a member selected from the group consisting of hydrogen, methyl and ethyl, $R_2$ represents a member of the group consisting of hydrogen and alkyl groups containing from 1 to about 4 carbon atoms and $n$ represents a whole positive integer of from 2 through 4. Preferred lactams of this type are those wherein R and $R_1$ are both hydrogen.

Typical N-vinyl lactams which may be used include

N-vinyl-2-pyrrolidone,
N-vinyl-2-piperidone,
N-vinyl-2-caprolactam,
N-vinyl-3-methyl-2-pyrrolidone,
N-vinyl-3-methyl-2-piperidone, or
N-vinyl-3-methyl-2-caprolactam,
N-vinyl-4-methyl-2-pyrrolidone,
N-vinyl-4-methyl-2-piperidone or
N-vinyl-4-methyl-2-caprolactam,
N-vinyl-5-methyl-2-pyrrolidone,
N-vinyl-5-methyl-2-piperidone,
N-vinyl-3-ethyl-2-pyrrolidone,
N-vinyl-4,5-dimethyl-2-pyrrolidone,
N-vinyl-5,5-dimethyl-2-pyrrolidone,
N-vinyl-3,3,5-trimethyl-2-pyrrolidone,
N-vinyl-5-methyl-5-ethyl-2-pyrrolidone,
N-vinyl-3,4,5-trimethyl-3-ethyl-2-pyrrolidone,
N-vinyl-6-methyl-2-piperidone,
N-vinyl-6-ethyl-2-piperidone,
N-vinyl-3,5-dimethyl-2-piperidone,
N-vinyl-4,4-dimethyl-2-piperidone,
N-vinyl-7-methyl-2-caprolactam,
N-vinyl-7-ethyl-2-caprolactam,
N-vinyl-3,5-dimethyl-2-caprolactam,
N-vinyl-4,6-dimethyl-2-caprolactam and
N-vinyl-3,5,7-trimethyl-2-caprolactam.

Of these several compounds, N-vinyl-2-pyrrolidone is most preferred as it is readily available and provides products having excellent properties.

The half esters of the unsaturated dicarboxylic acids used as copolymers in accordance with the present invention are generally half esters of lower unsaturated dicarboxylic acids, specifically half esters of such acids as: maleic, fumaric, itaconic, citraconic, mesaconic, etc. A preferred unsaturated dicarboxylic acid half ester is the half ester of maleic acid.

The ester portion of the half ester of the unsaturated dicarboxylic acid employed as a copolymer in the polymerization process of the present invention is the residue of an aliphatic, cycloaliphatic, aromatic, or heterocyclic alcohol. Thus, the ester moiety of the half ester of the unsaturated dicarboxylic acid can comprise any of the following exemplary radicals: aliphatic-methyl, ethyl, isopropyl, n-propyl, n-butyl, t-butyl, n-amyl, iso-amyl, n-hexyl, n-heptyl, n-octyl, iso-octyl, 2-ethyl-hexyl, oxo-octyl, n-nonyl, oxo-nonyl, n-decyl, iso-decyl, n-dodecyl, n-tridecyl, lauryl, stearyl, n-hexadecyl, n-octadecyl, eicosyl, etc.; cycloaliphatic-cylohexyl, etc.; aromatic-benzyl, etc.; heterocyclic-tetrahydrofurfuryl, furfuryl, etc.

Of the above, lower alkyl radicals derived from lower aliphatic alcohols are preferred.

The monoesters of the unsaturated dicarboxylic acids employed as one monomer in the polymerization of the present invention can be prepared by any process well known in the art. Thus, for example, such esters can be readily prepared by heating essentially equimolar amounts of the appropriate alcohol and the unsaturated dicarboxylic acid or anhydride at about 40 to 80° C. until the monoester is prepared by esterification of one of the carboxylic groups of the unsaturated dicarboxylic acid or anhydride. Again, such process and similar processes are well known in the art.

The most highly preferred half esters for use in the present invention are the derivatives of maleic acid of the following formula:

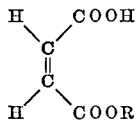

wherein R is a substituted or unsubstituted hydrocarbon group.

Representative hydrocarbon groups for R include the following:

(a) Alkyl groups and substituted alkyl groups of 1 to about 18 carbon atoms, either straight or branched chained, e.g. methyl, ethyl, n-propyl, isopropyl, n-butyl, isobutyl, n-pentyl, n-hexyl, nonyl, decyl, dodecyl; hydroxyalkyl, e.g. hydroxymethyl, 2-hydroxyethyl, 3-hydroxypropyl; haloalkyl, e.g. chloromethyl, 2-chloroethyl, 3-chloropropyl, etc. and the like; as well as unsaturated carbon chains such as akenyl (e.g. ethneyl, propenyl, etc.) and alkynyl (e.g. propynl, butynyl, etc.);

(b) Cycloalkyl groups of 3 to about 8 carbon atoms such as cyclopropyl, cyclobutyl, cyclopentyl, cyclohexyl, cycloehptyl and cyclooctyl;

(c) Aryl groups and substituted aryl groups (e.g. alkaryl) of about 6 to about 15 carbon atoms, e.g. phenyl, o-, m- and p-xylyl, tolyl, phenyl substituted by one or more alkyl groups of 1 to 7 carbon atoms, 1-naphthyl, 2-naphthyl and the like; and (d) Aralkyl groups of 6 to 15 carbon atoms such as benzyl, phenethyl and the like.

Especially preferred maleates which may be used are those where R is an alkyl group of 1 to about 10 carbon atoms, such as, for example, 2-ethylhexyl maleate, because of their ease of preparation, ready availability and properties of products produced therefrom. The invention will be described hereinafter with respect to the maleates.

The third reactant, the ethylenically unsaturated compound, may be described as one which contains a vinyl (—C=C—) linkage in the molecule capable of undergoing vinyl polymerization. Suitable compounds useful as such monomers are of the following formula:

wherein X is an aromatic hydrocarbon group, an aliphatic or cycloaliphatic hydrocarbon group, a nitrile group, a carboxylic acid ester group, an alcoholic ester group, an aldehyde group, a ketone group, an amide group, a heterocyclic ring group and the like.

Exemplary of X as an aromatic hydrocarbon group there may be mentioned aryl, alkaryl and arylalkyl of 6 to about 20 carbon atoms such as phenyl, biphenyl, naphthyl, alkylphenyl, e.g. tolyl, p-, m- and o-xylyl, benzyl, phenethyl and the like. Representative aliphatic hydrocarbon groups for X are alkyl of 1 to 7 carbon atoms, e.g. methyl, ethyl, n-propyl, isopropyl, n-butyl, etc. as well as cycloalkyl and carbon chains which contain additional double bond and/or triple bond unsaturation.

Exemplary of X as an acid ester group is X of the formula:

wherein $R_3$ is alkyl of 1 to 10 carbon atoms, cycloalkyl of 3 to 8 carbon atoms or aryl, aralkyl or alkaryl of 6 to 15 carbon atoms. Any of these groups may also be substituted with nitro, amino, halogen, nitrile, etc., groups. Alcoholic ester groups for X are those of the formula:

wherein $R_3$ is as above. Aldehyde groups which may be mentioned include those of the formula:

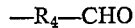

where $R_4$ is a single bond or the same as $R_3$ above. Similarly, ketone groups are of the formula:

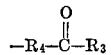

wherein $R_4$ and $R_3$ are as defined above. As amide groups, there is intended those of the formula:

wherein $R_3$ and $R_4$ are as defined above. As heterocyclic groups there is mentioned ring structures of 4 to 8 carbon atoms which also contain one or more nitrogen atoms, sulfur atoms or oxygen atoms in the ring, e.g. pyrrolidine, piperidine, pyridine, piperazine, indole, imidazole, pyran, furan, thiopyran, thiofuran and the like.

It is therefore to be understood that in general, the ethylenically unsaturated reactant is inclusive of those monomers which contain a vinyl grouping which is subject to vinyl polymerization under the reaction conditions. Especially preferred reactants of this class are alpha-mono-olefins of 1 to 7 carbon atoms, e.g. ethylene, propylene, 1-butylene, 1-pentylene, etc.; arylalkenes of 8 to 15 carbon atoms, e.g. styrene, vinyl toluene, phenylethylene, etc.; the alkyl acrylates, e.g. methylacrylate, ethylacrylate, etc.; vinyl esters such as vinyl acetate, vinyl propionate, etc.; acrylonitrile, alkyl vinyl ketones, e.g. methyl vinyl ketone, ethyl vinyl ketone, etc. acrylamide and dialkyl-substituted acrylamides. Mixtures of these compounds may also be used.

The multi-polymer system described in present invention can be varied over a wide range by:

(a) changing the ratio of the comonomers;
(b) varying the ester-group of the maleate;
(c) using various ethylenically unsaturated compounds with different substituents on the —CH=CH$_2$ group;
(d) The combination of (a) to (c).

It will be seen therefore that the resulting terpolymer with units containing the carboxylic acid group as well as the ethylenic compound provide functionalities through which the polymers may be subjected to various chemical reactions to yield a variety of products. Thus, the polymers of the invention provide a wide and flexible range of properties for film-forming polymers.

The ratio of each of these comonomers may be varied as desired over a wide range consistent with attainment of the desired properties. However, for obtaining optimum properties of the terpolymers, the following ratios by weight of the monomers are preferred:

| Monomer | Parts by weight |
|---|---|
| N-Vinyl lactam | 5 to 60 |
| Dicarboxylic acid half ester | 5 to 35 |
| Ethylene compound | 15 to 90 |

The polymers of this invention resulting from reaction of the above components consist of the units of vinyl lactams, the units of the half ester dicarboxylic acid and the units of another ethylenically unsaturated compound. These polymers wherein the half ester maleate is used, have the following general structure:

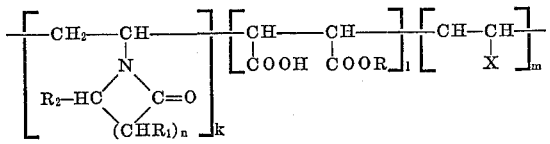

wherein $k$, $l$ and $m$ are integers representing the number of monomer units in the polymer and R, $R_1$, $R_2$, X and $n$ are as defined above.

These polymers, as indicated above, are useful as coatings, sizes, polishes, adhesives and in similarly related applications.

The polymers may also be crosslinked through the functional group by bifunctional compounds (e.g. glycols, diamines, diepoxy-compounds, etc.), by heat treatment or by other ways known in the art. By such treatment, increased solvent resistance, etc. may be achieved.

Some of the polymers of the invention are generally insoluble in water, alcohols, ketones, ethylacrylate, chlorinated solvents, aliphatic and aromatic hydrocarbons, but all of them are soluble in dimethyl formamide and N-methyl pyrrolidone.

The new polymers are conveniently prepared by subjecting a solution of the N-vinyl lactam and comonomers in the requisite amounts to conditions conducive to vinyl polymerization. Thus, copolymerization may be induced by the action of known free radicals, and proceeds exothermically once initiated. Suitable chemical catalysts include organic peroxides and organic hydroperoxides, alkali metal persulfates, aliphatic azo compounds (e.g. azo-bis-isobutyronitrile), as well as other free radical catalytic compounds known to the art. The catalyst is employed in a catalytically effective amount which may range from about 0.01 to about 5.0 parts by weight based on the weight of the total mixture. Physical initiators such as high energy radiation may also be used by known methods.

The reaction is generally carried out in a solvent system for best results, and particularly those solvents which boil below about 100° C. at atmospheric pressure. Solvents which have been found suitable for the reaction include the aliphatic alcohols with ethyl alcohol and isopropyl alcohol being especially preferred. Obviously, however, equivalent solvents may also be employed with good results by means known to the art. The solvent should preferably be dried prior to use.

The reaction is carried out in solution at temperatures ranging from about −10° C. to 180° C. or more; however, in order to avoid excessive exothermic conditions and to obtain desirable molecular weight polymers, it is generally preferred to initiate the copolymerization at about 60–90° C. The reaction is preferably carried out in an inert atmosphere, conveniently under a blanket of nitrogen, argon or the like, and at atmospheric pressure. Also anhydrous conditions should be used.

After the polymerization is effected upon completion of the solution and the heating period, the polymer will be observed to precipitate and may be recovered by filtration or evaporation of the solvent.

The following examples illustrate the invention but are not to be considered as limiting the same. In the examples, parts and percentages are by weight unless otherwise designated.

EXAMPLE I

Apparatus: 5 l. kettle equipped with mechanical stirrer, reflux condenser, gas inlet tube and thermometer.

Procedure: Anhydrous ethanol, 854 grams, 55.5 grams N-vinyl pyrrolidone, 114 grams 2-ethylhexyl maleate and 400 grams ethylacrylate were charged into the kettle. Azo-bis-isobutyronitrile, 2.2 grams, was added, the system was purged by nitrogen and was heated to 80° C. This temperature was maintained for four hours. At this point all the monomer was consumed. The system was cooled and discharged and the polymer recovered.

EXAMPLE II

Apparatus: 2 l. kettle equipped as described in Example I.

Procedure: Anhydrous ethanol, 500 grams, 100 grams N-vinyl pyrrolidone, 50 grams 2-ethylhexyl maleate and 350 grams vinyl acetate were charged into the kettle. Azo-bis-isobutyronitrile (AIBN), 1.25 grams, was added, the system was purged with nitrogen and was heated to 80° C. This temperature was maintained for 3 hours. At this point 0.5 grams AIBN was added. After the analysis of maleate was negative, the last traces of vinyl acetate were removed by adding 100 ml anhydrous ethanol and distilling off the same amount. The polymer was then recovered.

EXAMPLE III

Apparatus: As described in Example II.

Procedure: Anhydrous ethanol, 720 grams, 240 grams N-vinyl pyrrolidone, 120 grams 2 ethylhexyl maleate and 120 grams acrylonitrile were placed in the kettle. Azo-bis-isobutyronitrile, 1.44 grams, was added, the system was purged with nitrogen, and it was heated to gentle boiling. After about 1 hour at reflux, precipitation of the polymer was observed. The separation of the polymer continued for about 3 more hours, when the analysis of the supernatant liquid was negative for all monomers. The precipitated polymer was then recovered.

It is obvious that numerous changes and modifications can be made in the invention without departing from the spirit and scope thereof and all such obvious modifications are considered to be within the scope of the invention.

What is claimed is:

1. A film forming terpolymer of, approximately by weight, (A) 5–60% of an N-vinyl lactam of the formula:

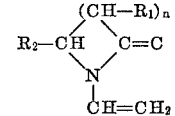

wherein $R_1$ is hydrogen, methyl or ethyl, $R_2$ is hydrogen or alkyl of 1 to 4 carbon atoms, and $n$ is an integer of 2 to 4; (B) 5–35% of a half ester of an unsaturated dicarboxylic acid and an aliphatic, aromatic, cycloaliphatic or heterocyclic alcohol; and (C) 15–90% of an unsaturated ethylenic compound of the formula:

wherein X is an aromatic hydrocarbon group, an aliphatic hydrogen group, a cycloaliphatic hydrocarbon group, a nitrile group, a carboxylic acid ester group, an alcoholic ester group, an aldehyde group, a ketone group, an amide group or a heterocyclic ring group.

2. A trpolymer according to claim 1 of the formula:

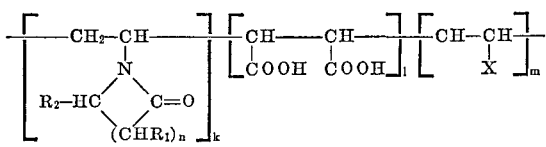

wherein $k$, $l$ and $m$ are integers representing the number of monomer units in the polymer, R is alkyl, alkenyl, alkynyl, hydroxyalkyl or haloalkyl of 1 to about 18 carbon atoms, cycloalkyl of 3 to about 8 carbon atoms, aryl of 6 to about 15 carbon atoms which may be further substituted by one or more alkyl groups of 1 to 7 carbon atoms, or aralkyl of 6 to 15 carbon atoms; and X is an aromatic hydrocarbon group, an aliphatic or cycloaliphatic group, a nitrile group, a carboxylic acid ester group, an alcoholic ester group, an aldehyde group, a ketone group, an amide group or a heterocyclic ring group; each $R_1$ is hydrogen, methyl or ethyl, $R_2$ is hydrogen or alkyl of 1 to 4 carbon atoms and $n$ is an integer of 2 to 4.

3. A terpolymer as defined in claim 1 wherein (A) is N-vinylpyrrolidone.

4. A terpolymer according to claim 3 wherein R is selected from the group consisting of methyl, ethyl, n-propyl, isopropyl, n-butyl, isobutyl, n-pentyl, n-hexyl, n-octyl, nonyl, decyl, tridecyl, dodecyl, octadecyl, ethenyl, propenyl, propargyl, butynyl, hydroxymethyl, 2-hydroxyethyl, 3-hydroxpropyl, chloromethyl, chloroethyl, cyclopropyl, cyclobutyl, cyclopentyl, cyclohexyl, cycloheptyl, cyclooctyl, phenyl, tolyl, o-, m- and p-xylyl, 1-naphthyl, 2-naphthyl, benzyl and phenethyl.

5. A terpolymer according to claim 3 wherein X is selected from the group consisting of aryl, alkaryl and arylalkyl of 6 to 15 carbon atoms; alkyl of 1 to 7 carbon atoms; cycloalkyl of 3 to 8 carbon atoms; nitrilo; —$COOR_3$, wherein $R_3$ is alkyl of 1 to 10 carbon atoms, cycloalkyl of 3 to 8 carbon atoms, aryl, aralkyl or alkaryl of 6 to 15 carbon atoms; —$OCOR_3$ wherein $R_3$ is as above; —$R_4$—CHO, wherein $R_4$ is a single bond or the same as $R_3$;

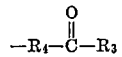

wherein $R_3$ and $R_4$ are as defined above

—$R_4$—$CON(R_3)_2$ wherein $R_3$ and $R_4$ are as defined above; and a ring structure of 4 to 8 carbon atoms which contain one or more nitrogen, sulfur or oxygen atoms in the ring.

6. A terpolymer according to claim 3 wherein R is alkyl of 1 to 7 carbon atoms, $R_1$ and $R_2$ are hydrogen, X is alkyl of 1 to 7 carbon atoms and $n$ is 2.

7. A terpolymer according to claim 3 wherein R is alkyl of 1 to 7 carbon atoms, $R_1$ and $R_2$ are hydron, X is —$OCOCH_3$ and $n$ is 2.

8. A terpolymer according to claim 3 wherein R is alkyl of 1 to 7 carbon atoms, $R_1$ and $R_2$ are hydrogen, X is —CN and $n$ is 2.

9. A terpolymer according to claim 8 wherein R is 2-ethylhexyl.

10. A terpolymer as defined in claim 9 wherein (B) is 2-ethylhexylmaleate.

11. A terpolymer as defined in claim 10 wherein (C) is ethylacrylate.

12. A terpolymer as defined in claim 10 wherein (C) is vinyl acetate.

13. A terpolymer as defined in claim 10 wherein (C) is acrylonitrile.

References Cited

UNITED STATES PATENTS 3,350,366  10/1967  Merijan _____ 260—78
3,511,817  5/1970   Fein et al. _____ 260—78.5

JOSEPH L. SCHOFER, Primary Examiner

J. KIGHT, Assistant Examiner

U.S. Cl. X.R.

260—80.6, 80.72; 80.73, 80.81

PO-1050
(5/69)

UNITED STATES PATENT OFFICE
CERTIFICATE OF CORRECTION

Patent No. 3,686,150            Dated August 22, 1972

Inventor(s) Eugene S. Barabas and Marvin M. Fein

It is certified that error appears in the above-identified patent and that said Letters Patent are hereby corrected as shown below:

Column 1, line 4, "Eugne S. Barabas" should read -- Eugene S. Barabas --. Column 3, line 55, "akenyl" should read -- alkenyl --, "ethneyl" should read -- ethenyl --; line 59, "cycloehptyl" should read -- cycloheptyl --. Column 7, line 1, "trpolymer" should read -- terpolymer --. Column 8, line 15, "hydron" should read -- hydrogen --.

Signed and sealed this 30th day of January 1973.

(SEAL)
Attest:

EDWARD M. FLETCHER, JR.            ROBERT GOTTSCHALK
Attesting Officer                   Commissioner of Patents